United States Patent [19]

DeMartino

[11] Patent Number: 5,830,361
[45] Date of Patent: Nov. 3, 1998

[54] METHOD TO IMPROVE PERFORMANCE IN PRECOAT FILTER DEMINERALIZERS WHEN APPLIED AS UNIQUE CONDENSATE TREATMENT SYSTEM IN BWR CONDENSATE TREATMENT SYSTEM

[76] Inventor: Roberto DeMartino, Via Privata Ghiggini n° 14 19038, Sarzana SP, Italy

[21] Appl. No.: 588,417

[22] Filed: Jan. 18, 1996

[51] Int. Cl.⁶ ........................................... C02F 1/42
[52] U.S. Cl. ..................... 210/679; 210/686; 210/777
[58] Field of Search .................... 210/679, 686, 210/777, 778, 193, 502.1, 505

[56] References Cited

U.S. PATENT DOCUMENTS

| | | | |
|---|---|---|---|
| 3,250,702 | 5/1966 | Levendusky | 210/686 |
| 3,674,686 | 7/1972 | Brimmer et al. | 210/778 |
| 4,007,301 | 2/1977 | DeMartino | 210/778 |
| 5,354,476 | 10/1994 | Kubo et al. | 210/686 |

FOREIGN PATENT DOCUMENTS

473 557  10/1994  European Pat. Off. .

*Primary Examiner*—Ivars Cintins
*Attorney, Agent, or Firm*—Keil & Weinkauf

[57] ABSTRACT

A method for treating water in a Boiling Water Reactor system including filtration through a four component system including ion exchange resins and an inert fiber is provided, as well as a method for preparing and depositing the filter compounds. The method overcomes problems of plugging and trimethylamine release, and allows for better absorption of iron oxides present in BWR condensate, while reducing the amount of radioactive waste material to be disposed of.

12 Claims, 4 Drawing Sheets

METHOD TO IMPROVE PERFORMANCE IN PRECOAT FILTER DEMINERALIZERS WHEN APPLIED AS UNIQUE CONDENSATE TREATMENT SYSTEM IN BWR CONDENSATE TREATMENT SYSTEM

BACKGROUND OF THE INVENTION

The invention is directed to a method of pre-coating filter elements with a four component system which includes ion exchange resin-based compounds and inert fiber and to a method of using the filters thus obtained in water treatment, in particular in BWR (Boiling Water Reactor) systems.

DESCRIPTION OF THE PRIOR ART

Most condensate liquid filtering systems that traditionally are used in thermic cycle condensate treatment consist of pre-coated filters. The filters are made of polypropylene thread elements coiled around a stainless steel core. The polypropylene thread elements provide most of the efficiency of the whole treatment cycle.

The polypropylene filter elements provide support for the filter material and have a porosity of between 2 and 20 micrometers. The filter material may consist of numerous types of products based on ion exchange resins in powdered form or other inert materials.

Several patents describe the use of pre-coat filter technology. U.S. Pat. No. 3,250,703 describes a filter support coated with a layer of ion exchange resin, obtained from a suspension in water of powdered resin, which functions to capture ions in the water being treated. The patent also discloses use of a layer of mixed anion exchange and cation exchange resins, in particular strong cation exchange resins. Once exhausted, the resin layer can be removed from its support and regenerated.

U.S. Pat. No. 4,548,717 recommends the same technique of coating the filter support, but discloses the use of a weak rather than a strong cation resin to obtain filter material which is easier to regenerate. The method described in this patent has been found unsatisfactory in many applications because the filter is unable to hold ammonium ions and amines. A pre-coat filter as disclosed in U.S. Pat. No. 4,548,717 would be unacceptable in a nuclear power plant since ammonium ions must not be present in a BWR cycle and amines are not retained by the filter.

The patent further discloses the use of mixed beds consisting of strong anion exchange resins and weak cation exchange resins which can be regenerated. In these filters that can be regenerated, resins are present in the form of large spheres which prevent the anion resin from interacting with the cation exchange resin through electronic linking. The anion and cation exchange resins remain free to regenerate cyclically. This filter differs substantially from that of the instant invention, in which anion and cation exchange resins interact to form flakes which are then deposited on the filter support to form the filter cake. Once these filter cakes are exhausted, they are not regenerated but removed and eliminated.

EP-A-O 473 557 discloses a compound consisting of a mixture of full-gel-type weak cation exchange resin combined with a strong anion resin (powdered), along with inert fiber. By choosing the appropriate type of cation exchange resin, it is possible for this compound to considerably lengthen the useful life of the filter. The use of a full-gel-type weak cation exchange resin (for example, resin obtained by polymerizing acrylonitrile and divinylbenzene) combined with a strong anion exchange resin enhances the swelling of the filter's coating layer. This results in noticeable improvements, such as an increase in the filter's average lifetime, elimination of turbidity, and a degree of water purity which is acceptable in nuclear power plants. The elimination of turbidity is especially important as it prevents plugging. A further advantage of using a weak cation exchange resin rather than a strong one, is that sulfates may be eliminated from the cycle.

Under certain conditions these improvements are insufficient, When the condensate reaches certain temperatures, for example, the coating made up of mixed weak cation exchange and strong anion exchange resin flakes may release trimethylamine (TMA) which the weak cation exchange resin is unable to hold. Further difficulties may be caused by the marked increase in lifespan of filters coated with the compound described in EP-A-O 473 557. The inert thread (usually polypropylene) covering the filter's metal core may become weakened by the combined presence of —$COO^-$ compounds from the weak cation exchange resin along with dioxides and ferrous oxide in circulation. It has been observed that the presence of oxygen and/or a temperature higher than normal room temperature will cause iron to act as a catalyst which causes the functional groups of polypropylene to be attacked by the —$COO^-$ groups borne by minute particles of carboxylic resin carried along in the stream.

SUMMARY OF THE INVENTION

In view of the foregoing disadvantages inherent in the prior art, the present invention aims to establish a method of precoating filters in BWR condensate treatment systems using a new filter compound based on ion exchange resins which is able to eliminate the various shortcomings of the prior art. The invention is further drawn to a method for using the filtration system.

The method of the instant invention utilizes a unique filtration compound which is especially suitable for treatment of condensate in a BWR system. More precisely, the filter compound described herein, when used as a filter coating, will eliminate or at least substantially reduce release of trimethylamine (TMA) or any other nitrogen compounds. Removal or reduction of these compounds is especially important in BWR cycles.

In addition, the filter compound will lengthen the use life of the filter cake, thereby reducing the amount of waste material to be disposed of.

The method of the instant invention also prevents problems present in the prior art, caused by damage to the polypropylene thread or similar inert support material caused by creating longer-lasting filter cakes. The new method includes application of the filter compound as filter pre-coating in order to improve the life and efficiency of the filter.

Another aim of the instant invention is to establish a method of thermal cycle condensate filtering which will lead not only to longer-lasting filter cakes, but also to enhanced purity of the condensate being treated.

The choice of filter coating material is very important since material which is not entirely suitable or a coating method which is incompatible with the material may lead to inefficiency in the function of the cake and filter element. This would compromise the whole condensate filtering system.

The condensate filtering system of a BWR-type nuclear thermic cycle requires thorough and reliable purification of the condensate being treated. In a BWR circuit fitted with a titanium condenser, the major pollutant for 99% of the plant's operation consists of ferrous oxides.

The amount of ferrous oxide (mainly alpha $Fe_2O_3$) present in the condensate entering the treatment filters may vary from 5 to 100 ppb (parts per billion) under normal thermal cycle operating conditions, and may be significantly higher during the startup of the cycle. The pre-coat filters responsible for cleaning the condensate must be extremely efficient for several reasons. The filters must capture ferrous oxides and metal oxides, and the filters should have a high capacity which would allow long intervals between the application of the filter layer and removal to apply a new layer of coating. Since the filter cake lasts longer, fewer cakes are needed and therefore fewer cakes must be disposed. This is advantageous since radioactive waste has to be solidified or incinerated at enormous disposal costs.

Careful studies were undertaken with the goal of increasing the life of the filter cake for as long as possible in order to reduce the number of cakes which must be disposed of as radioactive waste, while at the same time maintaining the purity of the water circulating through the nuclear reactor at an acceptable level.

BRIEF DESCRIPTION OF THE DRAWINGS

The attached drawings will help to clarify the invention being described.

FIG. 1 shows a filter element, while

DETAILED DESCRIPTION OF THE INVENTION

The method of the present application makes use of ion exchange resin compounds to form coatings for filter elements which are used in the treatment of BWR condensate. The benefits offered by the filter compound are largely due to its composition, which is as follows:

a weak carboxylic acid cation exchange resin of the full-gel type, powdered;

a strong cation exchange resin, and a powdered anion exchange resin an inert fiber The proportions of the compound, expressed in dry weight, are from 30 to 60% weak cation exchange resin with 30 to 60% anion exchange resin, 1 to 15% of strong cation exchange resin, and 1 to 10% of inert fiber. Ideally, the percentage of strong cation exchange resin should not exceed between 1 and 15%, while the weak cation exchange resin should be between 50 and 60% and the anion exchange resin between 40 and 50% The inert fiber is ideally present in a quantity of 3 to 5% of the total dry weight.

The full-gel-type weak acid cation exchange resin which is effective in the contemplated process is obtained from polymerization of divinylbenzene and acrylonitrile as illustrated by the formula:

Excellent results have been obtained by using the weak carboxylic acid cation exchange resin PUROLITE® C105, suitably ground. The choice of weak acid cation exchange resin is critical. The acrylonitrile/divinylbenzene polymer was the only polymer which was found suitable as a weak cation exchange resin in the process.

The weak acid cation exchange resin is mixed with a strong sulfonic cation exchange resin, most preferably PUROLITE C145H, also ground, and with a powdered anion exchange resin, either strong or weak. The strong cation ion exchange resin contemplated is a low cross linked cationic exchanger used in hydrogen form, having a maximum content of divinylbenzene of 8%. This resin is used in a ratio of 3 to 15% of the total dry materials contained therein.

The ratio of strong cation exchange resin is increased to implement the salt splitting capacity of the product when needed. This resin is able to significantly remove colloidal iron from aqueous solutions. In particular, the resin is able to remove the needle form of a colloidal iron oxide, γ FeOOH, which is very penetrating. The increase in salt-splitting capacity is an important reason for including the strong cation exchange resin. The amount must be carefully dosed, however, to avoid the presence of sulfates downstream at the condensate filter which could cause a reduction in the benefit of using a long distribution cycle.

The weak cation exchange resin is preferably ground to an average particle size of 40 micrometers, while both the anion exchange resin and strong cation exchange resin should be around 70 or 80 micrometers. When water is added to the mixture of resins, they coagulate forming a wide soft flake which is deposited on the thread base of the filter, which will be described in further detail. While the filter cake is being transported, it is intentionally torn to take on the ideal dimensions to form a filter cake.

The filter cake deposited on the filter base contains a strong cation exchange resin which performs two fundamental roles. The first is particularly effective when a strong anion exchange resin is used, causing release of trimethylamine during startup of a new cycle following formation of a freshly applied cake. The presence of a minimum percentage of strong cation exchange resin in this case is sufficient to capture the amines and prevent them from entering circulation. The second function is performed by the presence of sulfonic groups ($SO_3^-$) which prevent interaction between —$COO^-$ groups and the polypropylene covering the filter core which leads to damage to the thread and the risk of breakage.

The percentage of strong cation exchange resin is low enough to avoid the typical negative effects of compounds based only on strong cation exchange resin (e.g. release of sulfonic groups in the presence of oxidizing agents like $O_2$ and $H_2O_2$), while being sufficient to prevent release of trimethylamine and above all, to avoid damage to the polypropylene.

The side effects of release of trimethylamine and polypropylene thread deterioration were not observed when strong cation exchange resins were used since they do not cause formation of —$COO^-$ groups which are the main cause of polypropylene thread weakening. In addition, strong cation exchange resins prevent the anion exchange resins from releasing trimethylamine into the system.

The anion exchange resin used should be of the strong type, such as Purolite NRW 600 or PUROLITE NRW 400, or other similar alternatives. It has been observed that optimum swelling of the resin during cake formation and filter cake coating is given by strong anion exchange resins containing at least 6% of divinylbenzene as a meshing agent. Therefore, PUROLITE resin NRW 600, containing 6.5% of divinylbenzene, gives better results in terms of swelling than PUROLITE NRW 400. The increase in swelling caused by strong anion resins exchange with a high percentage of divinylbenzene has tripled or even quadrupled the life of the filter cake.

As an alternative to a strong anion exchange resin, it is also possible to use a weak anion exchange resin. Good results have been obtained with the use of PUROLITE C145H as a strong cation exchange resin, PUROLITE C105E as a weak cation exchange resin and PUROLITE NRW 845 (or PUROLITE A 100 or MITSUBISHI® A 392) as a weak anion exchange resin. The most suitable weak anion exchange resins have been observed to be those with a styrene-divinylbenzene or acrylic-divinylbenzene matrix.

The increase in the life of the filter cake obtained by using the resin combination above has however created drawbacks caused by long-term deterioration of the cake since it loses its initial elasticity. This may lead to minute resin particles being carried into the polypropylene thread of the filter elements, irreversibly choking it up.

In order to avoid this problem, further experimentation was carried out by adding a further component to the filter compound; in particular, incompressible inert fiber in percentages varying from 1 to 10% dry weight. Suitable fibers include polyacrylonitrile, polyester, polypropylene, combinations of these, or other fibers with similar characteristics. As an alternative, the inert fiber can be eliminated since the strong cation resin may be used in fiber form.

Figure 1:
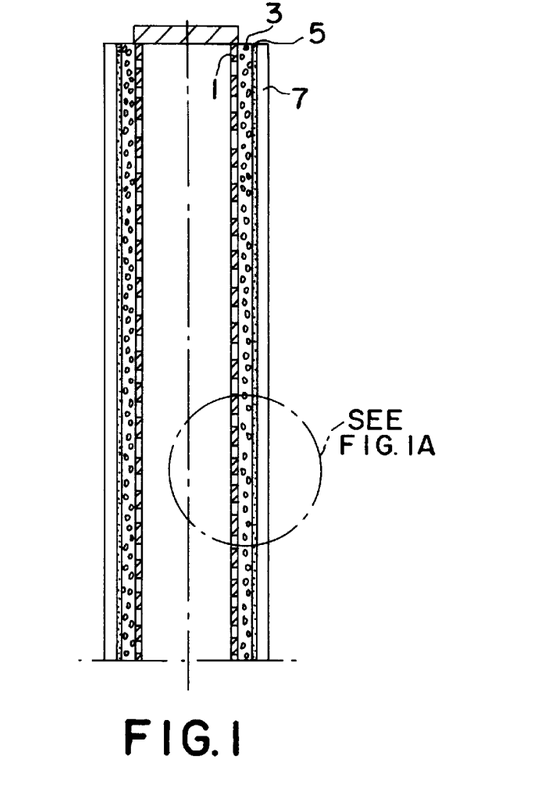
Figure 1A:
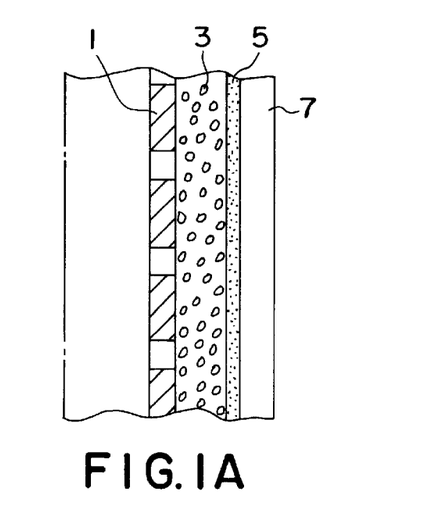
FIG. 1A is an enlarged detail of FIG. 1.

Reference is made to the drawings to facilitate a detailed description of the method of the invention. FIGS. 1 and 1A show a filter element already covered with the filter cake The filter element is made up of an inner core 1 of stainless steel or other material suitable for the cycle. The thread 3, made of polypropylene or a similar material, is wound around the core structure and forms the external surface on which the filter cake is deposited. The filter element composed of the thread and core has a relative porosity between 2 and 3 micrometers.

As will be described in further detail, an initial layer 5 is then deposited on the filter element. This layer is almost entirely made up of inert fiber such as polyacrylonitrile or a similar substance. These inert fibers are preferably between 15 and 20 micrometers in diameter with a length of 250 to 350 micrometers. The layer 5 of inert fiber is approximately 3 mm thick.

The inert fiber therefore performs several functions in the process. The prelayer of inert fiber on the surface of the filter elements prevents direct contact between the filter cake and the polypropylene elements, and it prevents the direct contact of iron extracted from the condensate on the polypropylene filaments. The use of fiber in the filtration compound permits an in depth filtration action on the filtration panel as the fiber material permits constant swelling of the filtration material. The swelling causes the change in pressure across the filtration panel to be lower which causes the filtration panel to last longer. The life of the filter panel is prolonged and the panel does not have to be changed as often, resulting in fewer interruptions in the process.

A further layer 7 is then deposited on the inert fiber layer 5. This layer is composed of flakes obtained form a water-based suspension of mixed powdered ion exchange resins; in particular a weak cation exchange resin, a weak or strong anion exchange resin, and a strong cation exchange resin. An inert fiber may be added unless one of the other resins is already in the form of a fiber. The external layer 7 is approximately 6 mm thick.

Figure 2:
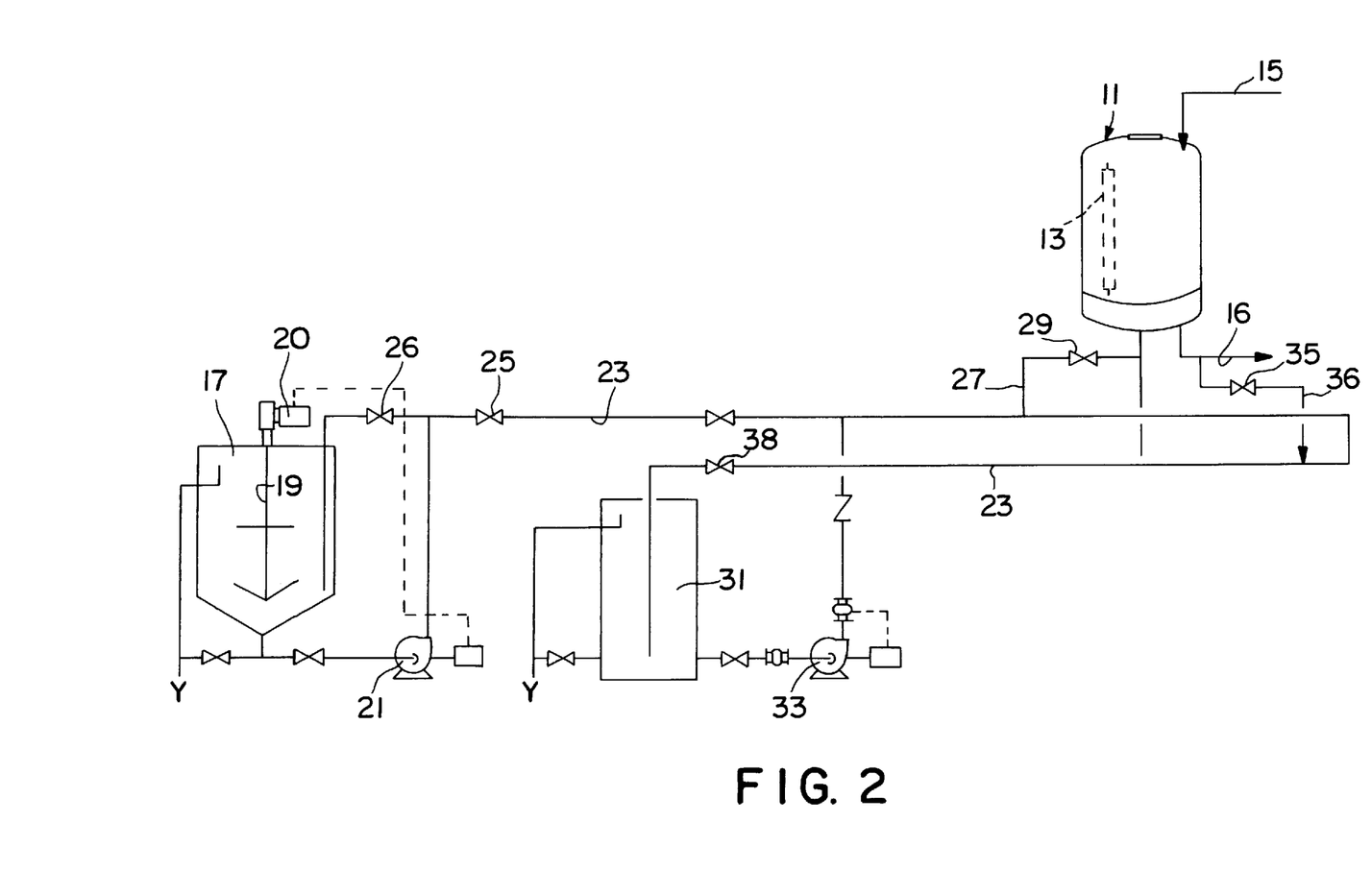
FIG. 2 illustrates the system by which the filter is coated as described herein.

FIG. 2 shows the filtering circuit with the various parts performing the coating process. A pressure vessel 11 which forms the filter for the thermal cycle houses a number of filter elements 13 of the type described in FIG. 1. This vessel 11 has an inlet 15 and an outlet 16 for entry and exit of the condensate undergoing treatment. The process of coating the filter elements 13 begins in a pre-coat tank 17 in which a stirred 19 is operated by a motor 20. The pre-coat tank 18 is connected to an injection pump 21 which draws the solution from the bottom of the tank 17 and delivers it through a feed pipe 23 which is fitted with valves 25 and 26. The feed pipe 23 is connected through an offtake pipe 27 to another intake in the filter 11 by means of another valve. In addition recycle pump 33 draws off water to be pumped into the feed pipe 23 from the bottom of auxiliary tank 31.

The outlet pipe from filter 11 is connected back to feed line 23 through offtake pipe 36 and valve 35. Feed line 23 ends in tank 31. A further valve 38 is located between offtake 36 and the end of pipe 23 in this tank.

The filter element coating process takes place in two main phases as follows. Tank 17 and auxiliary tank 31 are filled with demineralized water. The quantity of inert fiber needed to form layer 5 is then added to the water in tank 17. First, water circulation is primed by pumping water from the auxiliary tank into filter 11 through pipe 23, offtake 27 and valve 29, and then back through valve 35 and offtake 36. The pumping action takes place by means of recycle pump 33. Next, a dosage of inert fiber is circulated by injection pump 21 through valve 25. Dosage is set at a rate of 0.1 to 3% of total circulation flow ( the total flow passing through filter 11).

Once the supply of fiber in tank 17 has been used up, the next phase is the application of the resin mixture. Tank 17 is again filled with demineralized water to which is added the correct amount of powdered resin mix. The resulting suspension will be a 5% dry weight concentrate which must be stirred for 5 minutes to provoke coagulation, resulting in the formation of large flakes (6 to 10 mm) in tank 17.

As in the previous phase, only water from auxiliary tank 31 is circulated by recycle pump 33 to filter 11. Dosage of the suspension ready in tank 17 is started by injection pump 21. Dosage is fixed at a rate of 0.4 up to 2% of the total circulation flow created by recycle pump 33. During the dosage phase, the flakes sucked through injection pump 21 are reduced to minute dimensions as a result of the enormous speed at which they are carried to filet 11. The flakes are reduced in size to fragments of between 0.55 mm to 1 mm. This type of fragmentation will only take place with a resin mix as previously described in which the weak cation component is a full-gel type resin based on acrylonitrile.

The minutely fragmented flakes enter filter 11 where they form a homogenous coat on filter elements 13, thereby forming layer 7. The diameter suddenly widens upon entry into vessel 11. The flakes are then able to settle on the filter elements and swell again, becoming 2 or 3 mm in size and forming extremely soft porous agglomerates which guarantee long-lasting filtering performance.

The inner layer of inert fiber 5 created during the first filter element coating phase guarantees protection of the filter element, especially the polypropylene thread 3 by preventing resin particles from penetrating between the coils of the thread. The risk of this penetration is higher during the later stages of the life of the filter cake when the flow resistance of the filter increases by approximately 1 kg/cm$^2$.

Once the filter elements have been coated as disclosed above, it is important that sudden changes in condensate flow rate through the filter or sharp temperatures variations are avoided. These conditions cause stripping and erosion of the soft and fresh filtering material that has been deposited. The flow rate must be gradually increase when a new panel is introduced to maintain a soft panel and to prevent the erosion of resin when the panel is fresh. Care must be taken to establish appropriate maximum flow and temperature gradients to which the fresh filter cake materials 5 and 7 may be subjected, especially when they have been recently placed in the condensate cycle. With cool condensate (max. 40° C.), the flow increase upon entry into the filter should not exceed 0.5 m$^3$/h per m$^2$ of filter surface area, starting from a minimum flow rate of 5 m$^3$/h/m$^2$ for pre-coat flow speed and increasing to reach normal running flow rate. In other situations, flow rate increase should be between 0.1 and 1.5 m$^3$/h per m$^2$ until reaching normal flow rate. The fresh cake of filter material may be subjected to a gradual temperature increase of 3° to 15° C./h, starting from a minimum condensate temperature of 20° C.

Under normal running conditions, the filter cake 5, 7 will be able to capture metallic oxides, particularly ferrous oxide, as well as any loose ions present in the solution. The filtering process is primarily mechanical, and oxides are captured and held by the structure of the flakes formed by interaction between the three ion exchange resins. In the case of any release of trimethylamine or other anion compounds by the strong anion exchange resin (if used in place of a weak anion exchange resin) they will be captured by the strong cation exchange resin present. In addition, the sulfonic groups of the strong cation exchange resin will prevent any reaction between —COO$^-$ groups and the polypropylene thread 3 which would otherwise take place when $O_2$ and ferrous oxides are present.

When a hydraulic flow resistance of 1 bar has been reached in the filter 11, the flow through the filter will be interrupted temporarily. This leads to swelling of the filter cake which causes microfissuring. Due to this breakthrough phenomenon, flow resistance in the filter will be greatly reduced, and the filter can be put back to work at the top flow rate even in a short period of time. In this way, the filter gains renewed functional capacity and consequently a much longer lifespan than that of conventional filter cakes.

The process described above has made it possible to obtain excellent results in compliance with turbidity limits imposed by the specifications of the process of the user, increases in the lifespan of the filter, as well as the removal of traces of iron from the water.

Figure 3:
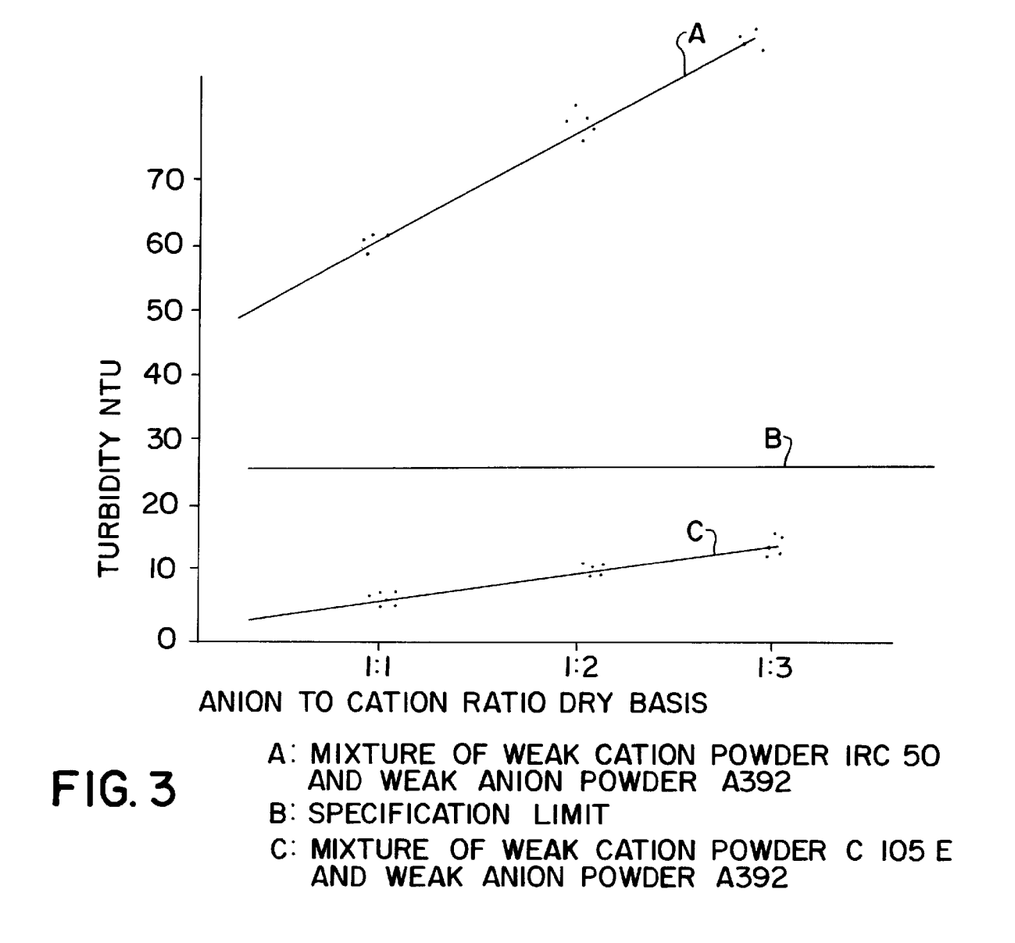
FIG. 3 is a graph showing turbidity measurement results, comparing the procedures described for this invention with other traditional products.

In FIG. 3, the horizontal axis of the graph gives the ratio of weight between cationic and anionic exchange resins, while the vertical axis represents turbidity values in the filter, expressed in Nephelometric Turbidity units (NTU). Line A plots data obtained using a non full-gel resin (specifically AMBELITE® IRC 50) as a cation exchange resin, while line C plots data referring to use of PUROLITE C105E as a weak cation exchange resin, including 3% dry weight inert fiber and an equal percentage of strong (sulfonic) cationic exchange resin. A weak anion exchange resin (MITSUBISHI A 392) was used in both cases. Line B indicates the maximum values allowed in the process by the user.

Figure 4:
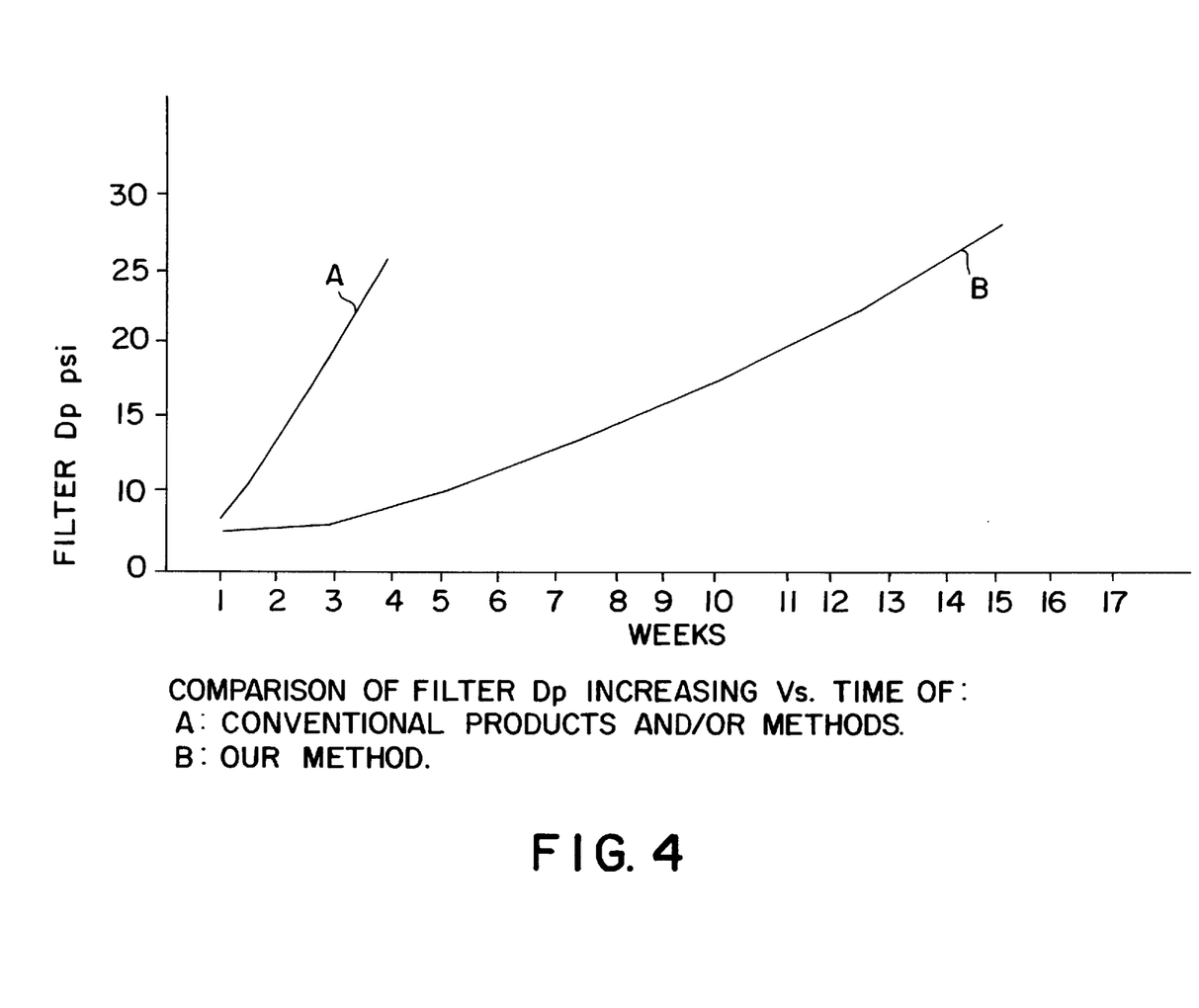
FIG. 4 is another graph illustrating the working life of pre-coated filters according to various resins used.

FIG. 4 is a different graph showing the increase in the lifespan of the filter which may be obtained with the process described in detail above. The horizontal axis represents the number of weeks of functional life, while the vertical axis gives the flow resistance through the filter element. Curves A and B plot the respective performances of a conventional product and the product described in this invention.

What is claimed is:

1. A method for the removal of impurities from a liquid, comprising the following steps:
    A) preparing a water-based suspension of a mixture, the mixture comprising a weak carboxylic acid cation exchange resin of the full-gel type, a strong cation exchange resin and an anion exchange resin, wherein the mixture further contains at least one inert fiber component;
    B) stirring said suspension to provoke coagulation to form flakes of resin;
    C) depositing the flakes of resin upon a porous structure to form a filter cake;
    D) filtering the liquid with impurities through said filter cake and porous structure.

2. The method as defined in claim 1 wherein the flakes of resin obtained from the suspension are reduced in size before being deposited on the porous structure.

3. The method as defined in claim 1 wherein a layer of inert fibrous material is deposited on the porous structure prior to the depositing of the flakes of resin.

4. The method as defined in claim 3 wherein the inert fibrous material is a strong cation exchange resin.

5. The method as defined in claim 1 wherein the strong cation exchange resin is cross linked cation exchanger used in hydrogen form which has a maximum divinylbenzene content of 8%.

6. The method as defined in claim 1 wherein the anion exchange resin is a strong anion exchange resin.

7. The method as defined in claim 5, wherein said anion exchange resin has a divinylbenzene content greater than or equal to 6%.

8. The method as defined in claim 1 wherein the anion exchange resin is a weak anion exchange resin.

9. A method for the removal of impurities from a liquid, the method comprising the following steps:
    A) introducing a quantity of demineralized water into an auxiliary tank and a pre-coat tank, the pre-coat tank having a bottom part the pre-coat tank being connected to an injection pump which draws solution from the bottom of the pre-coat tank to a filter having filter elements;

B) introducing into the pre-coat tank a pre-determined quantity of inert fiber;

C) circulating water from the auxiliary tank by means of a recycle pump to the filter, the filter having an outlet which is connected to the auxiliary tank;

D) introducing the contents of the pre-coat tank, including the inert fiber, to the filter by means of the injection pump;

E) refilling the pre-coat tank with demineralized water;

F) preparing a water based suspension of a powder mixture in the pre-coat tank by adding a resin powder mix, the water based suspension comprising a weak carboxylic acid cation exchange resin of the full-gel type, a strong cation exchange resin and an anion exchange resin wherein the suspension contains at least one inert fiber component;

G) stirring the water based suspension to provoke coagulation, whereby flakes are formed;

H) introducing the flakes from the pre-coat tank to the filter by means of the injection pump, whereby the flakes are reduced in size and form a filter cake on the filter elements;

I) running the liquid containing impurities through the filter cake, whereby impurities are removed.

10. The method as defined in claim 9 wherein, in step I the rate of flow of the contaminated liquid is increased.

11. The method as defined in claim 9 wherein, in step I the temperature of the contaminated liquid is increased.

12. The method of claim 7 wherein the liquid containing impurities is condensate from a Boiling Water Reactor nuclear plant.

* * * * *

UNITED STATES PATENT AND TRADEMARK OFFICE
CERTIFICATE OF CORRECTION

PATENT NO.: 5,830,361

DATED: November 3, 1998

INVENTOR(S): DeMARTINO, Roberto

It is certified that error appears in the above-identified patent and that said Letters Patent is hereby corrected as shown below:

Col. 10, claim 12, line 13, "claim 7" should be --claim 9--.

Signed and Sealed this

Second Day of February, 1999

Attest:

Attesting Officer

*Acting Commissioner of Patents and Trademarks*